United States Patent
Skofljanec et al.

(10) Patent No.: US 6,419,199 B1
(45) Date of Patent: Jul. 16, 2002

(54) DEVICE FOR MONITORING A LOCKED CONDITION OF LOCKING AND SUPPORT COMPONENTS OF A CONNECTING DEVICE FOR FIXING A CHILD SEAT IN A MOTOR VEHICLE

(75) Inventors: Robert Skofljanec, Moos-Bankholzen; Dieter Bornhorst, Stockach; Sören Lemcke, Gaienhofen-Horn, all of (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/743,251
(22) PCT Filed: Jul. 7, 1999
(86) PCT No.: PCT/DE99/02101
§ 371 (c)(1), (2), (4) Date: Mar. 9, 2001
(87) PCT Pub. No.: WO00/01561
PCT Pub. Date: Jan. 31, 2000

(30) Foreign Application Priority Data

Jul. 7, 1998 (DE) .......................... 198 30 229
Feb. 25, 1999 (DE) .......................... 198 08 197

(51) Int. Cl.⁷ .............................................. A47B 97/00
(52) U.S. Cl. ...................................... 248/503.1; 24/633
(58) Field of Search ......................... 248/503.1, 550; 297/217.3, 253, 250.1; 296/65.03; 403/326, 315, 316, 317, 279

(56) References Cited

U.S. PATENT DOCUMENTS 4,920,620 A * 5/1990 Yamamoto et al. .......... 24/641
5,233,732 A * 8/1993 Yamanishi ................... 24/303
5,690,356 A    11/1997 Lane, Jr. ..................... 280/735
5,839,174 A * 11/1998 Chamings et al. ............ 24/633
6,079,744 A * 6/2000 Husby et al. ............. 280/801.1
6,082,481 A * 7/2000 Engler ......................... 180/268

FOREIGN PATENT DOCUMENTS

EP        0 819 566 A3    1/1998
EP        0 819 566 A2    1/1998

* cited by examiner

Primary Examiner—Ramon O. Ramirez
Assistant Examiner—Kofi Schultebrandt
(74) Attorney, Agent, or Firm—Fay, Sharpe, Fagan, Minnich & McKee, LLP

(57) ABSTRACT

The invention relates to a device for monitoring the locking position of a connecting device 5, especially the locking position of a device for fixing a child seat in a motor vehicle, with a base body 11, which can be connected with a support component 7 capable of being locked with a locking component 3, a slider 13 arranged in the base body 11, which when the base body is joined with the support component 7, can be impinged at time of transfer of locking component 3 to the locking position by the locking component and displaced from an initial position into an end position corresponding to the locking position, and with a detection device 15 provided in or at the base body 11 for detection of the correct locking position of the locking component 3 and the support component 7 by detection of the position of the slider 13, whereby the detection device 15 registers, in addition to the locking position, at least one additional position of the slider 13, at a distance from the locking position.

11 Claims, 3 Drawing Sheets

DEVICE FOR MONITORING A LOCKED CONDITION OF LOCKING AND SUPPORT COMPONENTS OF A CONNECTING DEVICE FOR FIXING A CHILD SEAT IN A MOTOR VEHICLE

BACKGROUND OF THE INVENTION

The subject invention is directed toward the art of monitoring devices and more particularly, to a device for monitoring the locking position of a connecting device including intermateable locking and support components. The invention is especially suited for monitoring the locked condition of a connecting device for fixing a child seat in a motor vehicle.

There are several established techniques for fixing a child seat in a motor vehicle. In one method, the child is placed into the child seat and then the seat together with the child are fastened to the motor vehicle using a two-point or three-point belt system already provided in the motor vehicle. In another method, the child seat can be first attached to the motor vehicle with additional belts installed in the vehicle. Thereafter the child is restrained using auxiliary belts integrated into the child seat itself.

The motor vehicle industry has recently developed new standards and a new connection system for child seats. These special child seats have integrated locking elements which are connected with rigid support elements provided in the motor vehicle. As an example, a pair of arms may be provided on the child seat which each respectively include frontal recess openings adapted to engage suitably formed U-shaped hoops which are firmly installed in the motor vehicle. After initially inserting the arms onto the hoop-shaped support components, the seat is thereafter more securely fastened by means of a locking device provided on the locking components or elsewhere on the child seat. This attachment system enables rapid installation of the child seat. Furthermore, since the child seat is solidly anchored to the motor vehicle, for all practical purposes there is no danger that the child seat will be torn from its anchorage during a collision.

One problem associated with child seats placed in motor vehicles, particularly when the child seats are placed on the front seat of the motor vehicle, is that air bag triggering must be prevented. Several systems have been developed for that purpose including infrared and ultrasound detection systems which attempt to ascertain whether or not a child seat is installed in the motor vehicle. Air bag triggering is prevented if the infrared or ultrasound detection systems determine that a seat is present. However, such systems can offer no guarantee of 100% accuracy.

In the art of restraining systems for motor vehicles in general, monitoring devices and methods are known for monitoring the locking position of a connecting device proper. As an example, monitors are available for determining the locked condition of a belt lock of a passenger restraining system. Such monitoring systems can be employed in order to prevent the triggering of an air bag in the event that there is no person in a particular seat, for example, the passenger seat. In those systems, when the belt associated with that seat is ascertained as being opened or unlocked, it is assumed that there is no person or passenger located on that associated seat. Traditional devices for monitoring the locking position of belt lock systems include, in most cases, a terminal switch which is contacted or otherwise actuated by a component of the belt lock system which is attached to the belt.

One problem with such systems, however, is that malfunctions are not always detectable. As an example, it is not possible to differentiate whether the belt lock is open or whether the circuit closer is defective and the electrical switch contact was not closed despite the successful locking of the belt lock components. In this context, unpublished German Patent Application 198 30 229 describes a device for monitoring the locking position of connecting devices which can be integrated in a simple fashion into existing and known belt lock connecting devices. The device for monitoring the locking position of the connecting devices described in the application accounts for this error condition.

The above monitoring device ascertains two (2) relative positions between the locking component and the support component of a connecting device during joining of the components from an unlocked to a locked condition. During joining of the components of the locking device, at least one displaceable tag on one of the components is moved from a first initial position to a second end position. First and second sensor devices respectively ascertain the presence or absence of the tag in the initial and end positions. Using this approach, it is possible to not only calibrate the monitored connecting device with regard to the locked condition of the components, but to ascertain connecting phases of the connecting process. As an example, it can be determined with this device if one of the pair of sensors has failed. In addition, the monitoring device can determine whether the tag has been destroyed.

The state of the art described above is limited, however. There remains a need for a device for monitoring the locking position of a connecting device, especially the locking position of a connecting device for fixing a child seat to a motor vehicle. It is preferred that the monitoring device can be installed in a simple fashion in a motor vehicle which is suitably provided with at least one support component of the overall child seat connecting device. It is also desirable to provide such a device which can monitor the connection state of a child seat connecting device in a simple fashion yet while anticipating the essential possibilities for failure.

SUMMARY OF THE INVENTION

The subject invention provides an apparatus for monitoring a locked condition of an associated connecting device adapted for attaching a child seat to a motor vehicle. The associated connecting device includes a support component attached to said motor vehicle and a locking component attached to said child seat. The apparatus comprises a base body selectively connectable with the support component, a slider on the base body and a detection device. The slider is movable relative to the base body during transfer of the locking component from an unlocked condition to a locking position. The slider is disposed on said base body at a location to contact the locking component and is adapted to be displaced from an initial slider position corresponding to the unlocked condition of the associated connecting device to an end slider position corresponding to the locking position of the associated connecting device. The detection device on the base body is adapted to detect said locked condition of the locking component and the support component by detecting the slider in said initial slider position when the associated locking component is in the unlocked condition, and detecting the slider in said end slider position when the associated locking component is in the locking position.

In accordance with an aspect of the invention, the subject device recognizes a common failure mode of prior art switch monitoring devices, namely that even though the connecting device is in a locked position and the end switch is activated, the internal contact may not be closed correctly due to wear and tear of the contact elements, or the like. Accordingly, in order to recognize this functional failure mode, the present invention monitors at least two positions of a slider member. More particularly, the device according to the present invention monitors not only the locked end position of the slider member but, in addition, monitors at least one other position of the slider a distance spaced apart from the locking position. As a result, the functional safety of the monitoring device is drastically improved.

As examples of improved safety, the device of the present invention recognizes a failure mode of the switches when the connecting device is in a locked condition by first monitoring the switch signals when the slider member is in a position spaced apart a distance from the locking position. This initial position of the slider member indicates an unlocked or pre-locked condition of the connecting device. Conversely, the present invention recognizes the opposite sensor failure mode, namely the mode in which the sensor detecting the unlocked condition of the connecting device is present. In that regard, a signal that the slider member is in a position indicating that the connecting device is in the locked condition but without first receiving a signal that the slider device represents the unlocked condition presents the opposite error condition.

In accordance with another aspect, the device of the present invention generates an "unlocked" failure signal only when there is an actual attempt of producing a locking connection between the locking and support components of the connecting device. The device of the present invention recognizes a locking attempt in two ways. In the first, the device monitors the movement of the slider member off from an initial position which indicates that the connecting device is in an unlocked condition. Also, a locking attempt is noted when the slider member transitions to a state indicating that the connecting device is moved to the locked condition. In contrast thereto, in prior art monitoring devices with simple end switches, it was only possible to generate a constant "unlocked" failure signal when the belts are not connected in the example of lap and shoulder belts, from starting the ignition of the vehicle until the actual locking of the connecting device. Systems of this type were used primarily in connection with restraining systems in automobiles whereby in actual practice, they turned out to be troublesome in that the failure signal was often generated, regardless of whether or not the operator wanted to actually produce a locking.

In accordance with a more detailed aspect of the invention, the monitoring device includes a basic body member which is formed so that it can be selectively locked together or screwed together with the support component of an associated connecting device. This results in an extremely simple installation of the monitoring device. Also, the present invention enables simple retrofitting capabilities. Each associated connecting device includes a locking component and a support component.

In accordance with a further aspect of the invention, the basic body includes a guidance region for the locking component. The guidance region defines an insertion channel for receiving the associated locking component portion of the associated connecting device. In that regard, this helps facilitate connection between the associated locking and support components when the connecting device is not readily visible or accessible without difficulty. This may occur, for example, when the support components are provided in the gap of a motor vehicle seat between the seating area and the back rest. In that case, the guidance region of the basic body of the subject device is suitably formed in a fashion so that it substantially extends into the gap between the seating area and the back rest so that the locking components of the connecting device, such as a child seat, can be simply inserted into the then visible openings of the guidance regions. The insertion channel defined by the guidance regions facilitates simple insertion of the locking components into the locking position.

In accordance with a further aspect of the invention, engagement recesses are provided in the side walls of the insertion channel. The engagement recesses are adapted to accept the support component of the connecting device. As a result, the base body of the monitoring device can be simply clipped onto the locking component prior to connection of the locking components onto the support components. This embodiment including the guidance region is also useful with known detection devices which monitor only the locking position. Further, the embodiment is useful in combination with additional previously and subsequently explained characteristics.

In accordance with a further aspect of the invention, the slider member is movable relative to the body member of the device. A region of the slider member is oriented in a vertical or transverse direction relative to the direction of movement of the slider relative to the body. That portion of the slider is adapted for contact with the locking element and extends laterally substantially the entire width of the support component and at least over the width of the insertion channel in the region of the support component. This ensures that the slider will be activated and not damaged during the connecting process when a relatively narrowly designed locking component is engaged with the associated support component into the locked position.

In accordance with another aspect of the invention, one or more magnets are provided on the slider member. A detection device, preferably a Hall effect element device generates a signal when one or both of the magnets are detected. It is to be appreciated that in accordance with the invention, the detection device detects both the initial position of the slider as well as the end position of the slider. By recording or ascertaining the initial position, it is possible to constantly monitor the functional capability of the overall monitoring device and/or of the sensor devices for monitoring the initial position of the slider.

In accordance with a further aspect of the invention, the detection device generates at least a first and a second non-zero electrical signal, whereby the first electrical signal corresponds to the initial position or a suitable initial position range of the slider (connecting device in an unlocked condition). The second electrical signal corresponds to the end position or a suitable end position range of the slider (connecting device in a locked condition). By comparing the signals with predetermined theoretical values or predetermined value ranges, the present invention ascertains both the functional capability of the overall device as well as the position of the slider and, thus, in particular, notes the correct locking position of the connecting device.

In addition to the above, the detection device is adapted for further analysis of the signals into several "operating signals" or "failure signals". As an example, an "operating signal" represents that the detected initial position of the slider is present and the locked position of the slider is not detected. Conversely, a "non-locking signal" is generated as a failure signal when the detection device does not detect the initial position of the slider simultaneously with a non-detection of the locking position. This would indicate that the slider is between the first and second positions.

In accordance with another aspect of the invention, the detection device generates a third electrical signal when the slider is located between the initial position or range and the locking position or range. This is accomplished by ascertaining the non-detection of the tag on the slider represents that the slider is between the initial and the locking positions. Alternatively, a third sensor may be provided. Preferably, the third electrical signal is further processed into the "functional signals" and/or "failure signals" by the detection device via inter-connection of the third with the other previously described signals.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENT

Figure 1:
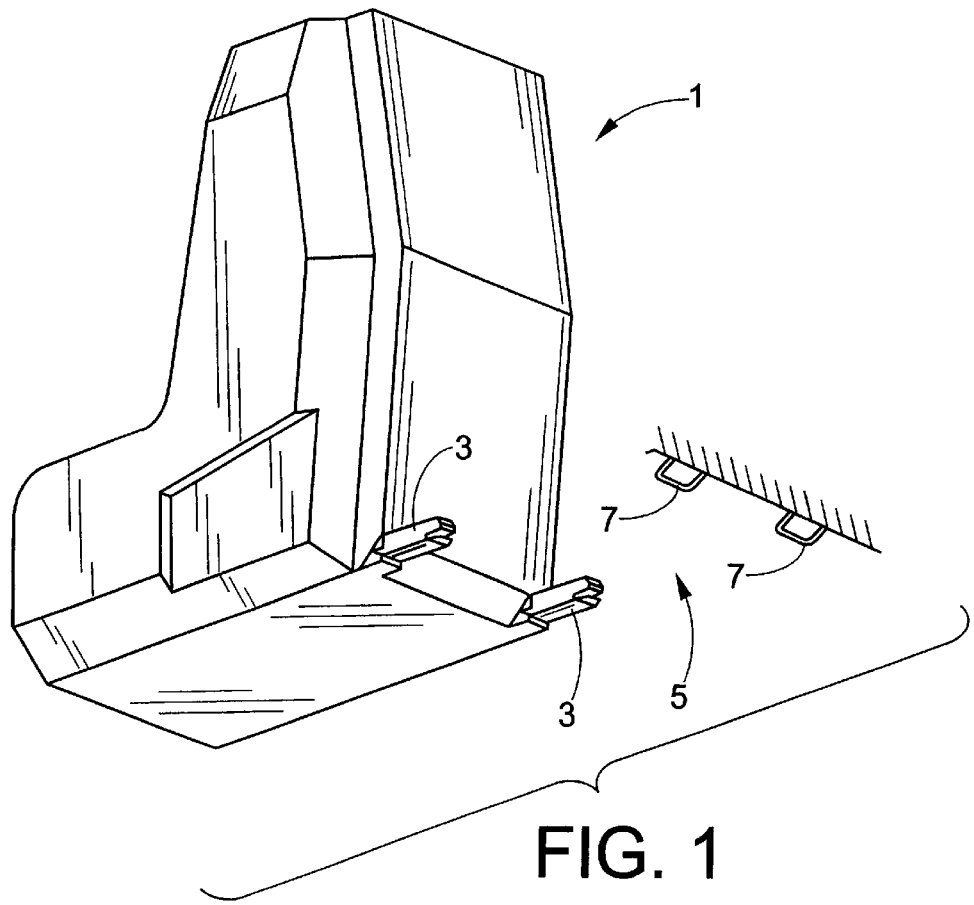
FIG. 1 is a schematic perspective view of a child seat provided with locking components for attachment to support components associated with a motor vehicle.

Referring now to the drawings wherein the showings are for the purposes of illustrating the preferred embodiments of the invention only and not for purposes of limiting same, FIG. 1 shows a child seat 1 and a connecting device 5 for connecting the child seat 1 to an associated motor vehicle (not shown). The connecting device 5 includes a pair of locking components 3 arranged in the lower rear area of the seating shell of the child seat and extending beyond the back rest portion of the seat. In addition to the locking element 3, the connecting device 5 includes a pair of support components 7 which are rigidly attached to the motor vehicle in a known manner. The support components 7 can also be arranged relative to the motor vehicle in a manner that they can be tilted from an inoperative position (not shown) to a working position as shown in FIG. 1. In any case, the support components 7 are designed in a manner that they safeguard adequate attachment of the child seat to the motor vehicle by securedly attaching the locking elements 3 with the support components 7.

As shown in FIG. 1, the support components are disposed in a manner relative to the vehicle that they are accessible via the gap or slot between the motor vehicle seat and the seat back rest. In the event that the support components 7 are of the type which are capable of being tilted from an inoperative position to a working position, the support components can protrude from the slot between the seating area and the seat back after they are tilted into the working position. Fixed or stationary support components are often recessed in the slot between the seating area and the back rest of the motor vehicle seat. It is to be appreciated that the present invention finds application in each of the above connecting device arrangements.

Figure 2:
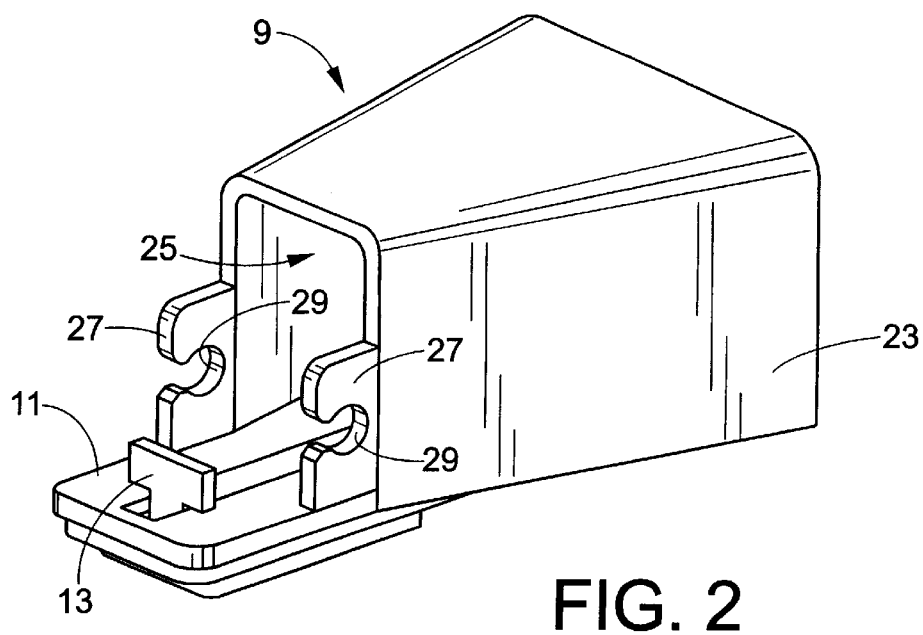
FIG. 2 is a perspective view of the subject monitoring device in accordance with a first embodiment of the invention.

The first preferred embodiment of a monitoring device 9 in accordance with the present invention is illustrated in FIGS. 2, 3a, 3b, and 4. With reference first to FIG. 2, the monitoring device 9 includes a base body 11 and a slider member 13 movable relative to the base body 11. As shown, the slider 13 is displaceable substantially along the general longitudinal axis of the base body 11 in a slot suitably formed therein. The position of the slider along its path is registered or detected by a detection device 15 shown in more detail in FIGS. 3a, 3b, and 4.

Figure 3A:
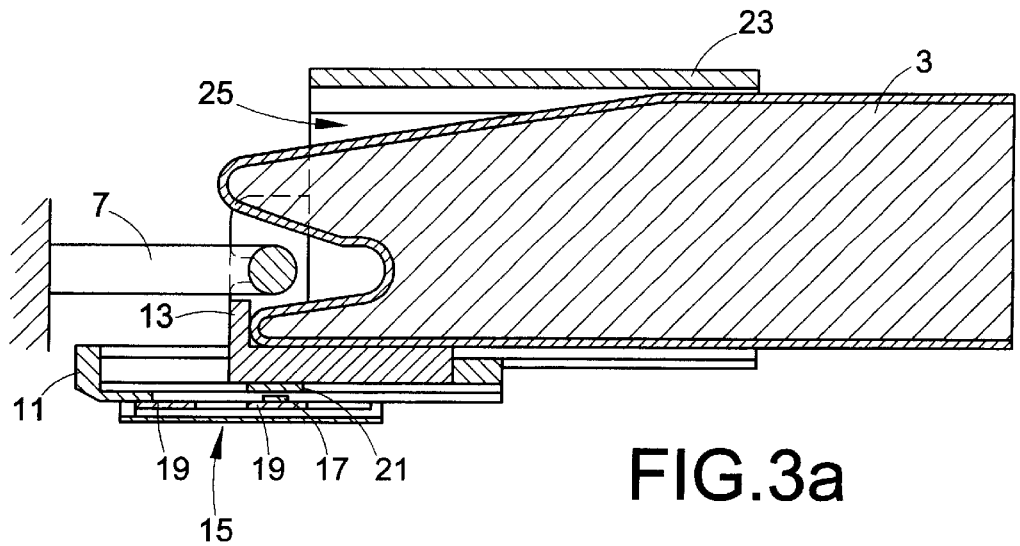
FIG. 3a is a cross-sectional view of the monitoring device shown in FIG. 2 showing the slider member in an initial position.
Figure 3B:
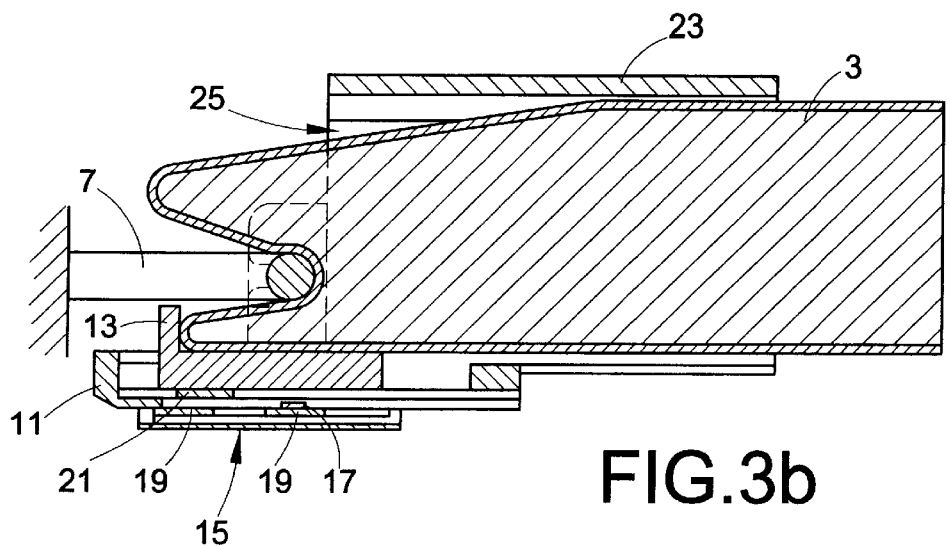
FIG. 3b is a cross-sectional view of the monitoring device shown in FIG. 2 illustrating the slider member in an end position.
Figure 4:
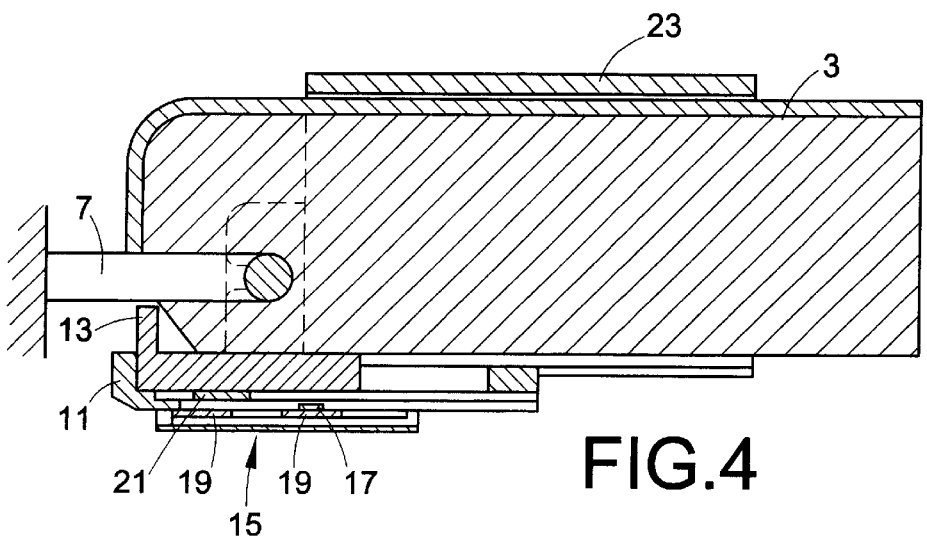
FIG. 4 is a cross-sectional schematic view of the monitoring device shown in FIG. 3 used in connection with a modified locking component on the child seat.

Turning to FIGS. 3 and 4, the detection device 15 is provided on the underside of the base body 11 and includes an electronic unit 17. In its preferred form, the electronic unit includes at least two (2) Hall sensors 19 which record the position of at least one magnetic element 21 provided on the under side of the slider member 13. As shown in FIG. 3a, a first Hall sensor element is positioned in a manner that it detects the original or initial position of the slider 13. The original position of the slider 13 is shown in FIG. 3a corresponds to the unlocked condition of the connecting device 5. The electronic unit 17 is adapted to determine whether the slider 13 is in the original position illustrated in FIG. 3a, or is moved off from the original position by impinging contact caused by a driving force of the locking component 3 relative to the base body 11.

It is to be appreciated that several magnetic elements may be provided to detect each single position of the slider relative to the base body such as, for example, two magnetic elements. For example, a pair of sensing devices may be provided in parallel and staggered or spaced apart in the coupling direction between the support and locking components. This provides a redundant sensor device scheme. In that case, a pair of magnetic elements are correspondingly provided which are likewise arranged in a staggered and parallel spaced apart fashion on the slider. Further, it is to be appreciated that the present invention contemplates the reversal of the position or locations of the tags with the sensing devices such as by providing the sensing devices on the slider and the tags on the base of the body.

It is further to be appreciated that any means of inductive, capacive, or other sensing type devices including optical sensing devices such as light carriers or the like can be used to detect the at least two positions of the slider member such as shown in FIGS. 3a and 3b.

With reference now to FIGS. 2–4, a guidance region 23 is formed by the monitoring device 9 to facilitate easy insertion and assembly of the locking components with the support components 7 when the support components 7 are recessed in the slot between the seating area and the back area of the motor vehicle seat. The guidance region 23 defines an insert channel 25 for receiving the locking component 3. Preferably, the guidance region 23 forms the insert channel 25 in a manner that a width thereof reduces or diminishes in a direction from an opening in the monitoring device 9 towards the slider 13. More particularly, the width of the insert channel 25 tapers in a horizontally transverse direction along a path from right to left as viewed in FIG. 2. This guarantees simple insertion of the locking elements 3 into the guidance regions 23 of the monitoring device 9. In addition, the shape and arrangement of the insert channel 24 prevents destruction of the guidance regions 23 when the locking components 3 are inserted into the guidance region 23 in a misaligned or canted orientation.

Locking regions 27 are provided on the guidance regions 23 as best shown in FIG. 2. The locking regions 27 are formed on the frontal sides of the side walls facing the slider 13 and provide locking recesses 29. The locking recesses 29 are adapted to attach to the transversely extending areas of the generally U-shaped support components 7 as best shown in FIG. 3a. Accordingly, the subject monitoring device 9 is very easily installed onto the associated support components using the locking recess and region portions of the monitoring device by simply clipping one end of the monitoring device onto the respective support components of the motor vehicle. This installation permits a tilting movement of the monitoring device 9 about an axis defined by the anterior region of the respective support components 7. This prevents destruction of the monitoring device during insertion of the locking components 3 when they are inserted at extreme angles. The monitoring device is advantageously loosely held and rotatable on the transverse areas of the support components 7.

With reference to FIGS. 3a and 3b, the slider member 13 is movable relative to the base body 11. In FIG. 3a, just prior to coupling the locking component 3 with the support component 7, the nose portion of the locking component 3 impinges the slider member 13 at an original or initial slider member position. Upon further insertion of the locking component 3 relative to the base body 11 of the subject monitoring device 9 through the insert channel 25 of the guidance region 23, the slider is moved or driven by the nose portion of the locking component from the position illustrated in FIGS. 3a into the final or rest position of the slider illustrated in FIG. 3b.

Preferably, the second Hall element 19 is positioned in such a manner that it detects the magnetic element 21 provided on the slider 13 when the slider is in the end position illustrated in FIG. 3b. Of course, the magnetic element 21 is located sufficiently close to the second Hall element 19 that a detectable signal is generated. The "detected" status is then detected by electronics when it exceeds a given predetermined threshold.

It is to be appreciated that the locking component 3 of the associated connecting device 5 can have many shapes, sizes, and profiles. The locking component 3 shown in FIGS. 3a and 3b has a "minimal-contour" size relative to the detection capabilities of the subject monitoring device 9. The "minimal-contour" of the locking component 3 produces the end position of the slider 13 depicted in FIG. 3b. This is accomplished with the locking component 3 securely locked together with the support element 7.

It is to be appreciated that the associated locking mechanism itself generates the actual locking effect between the locking component 3 and the support component 7. The particular arrangement of the locking mechanism is not shown and is irrelevant to the present invention. However, such mechanisms may involve or include conventional locking mechanisms which will, upon insertion of the support element 7 into the recess of the locking component 3 catch and automatically lock together and which may also comprise a manual unlocking device for their separation.

FIG. 4 shows the subject monitoring device 9 used in its "maximal-contour" application. FIGS. 3a and 3b show the subject mounting device 9 used in its "minimal-contour" application. As can be seen, the associated locking component 3 shown in FIG. 4 has a slightly different size and shape than the locking component 3 shown in FIGS. 3a and 3b. With respect to the minimal and maximal contour applications of the invention, the lower arm of the locking component impinges upon or contacts the slider member 13 in each case. As is apparent from FIG. 4, the slider 13 of the monitoring device 9 is formed in a fashion that, on the one hand, it guarantees a sufficient displacement path for insertion of the maximal contour until reaching the locking position (FIG. 4) and, on the other hand, in said maximal end position, detection is also possible of the magnetic element 21 by the second Hall element 19.

According to FIGS. 3b and 4, the present invention is applicable in both maximal and minimal contours of the associated locking component by selecting the longitudinal length of the magnetic element 21 together with a specified length of Hall element 19 in such a fashion that secure detection is enabled in both the minimal end position (FIG. 3b) as well as in the maximal end position (FIG. 4). As an example, the length and position of the magnetic element 21 is selected so that a full overlapping of the Hall element and the magnetic element is just barely realized with the minimal contour and, that a full overlapping of the magnetic component 21 and the Hall element 19 is realized with the maximal contour of the locking component 3. It may be necessary in that case to display the actual locking of the locking mechanism at the motor vehicle seat itself.

It is to be appreciated that in accordance with the invention it is possible to dimension the magnetic element 21 and the Hall element 19 mechanically and electrically in such a manner that a "locking signal" is generated only when the locking component 3 is actually inserted on the support components 7 and also inserted up to the catch and that a secure locking mechanism actually takes place. It is to be appreciated that adaptation of the specific contour of the locking component is, however, required in this case.

Turning now to FIG. 5, a second preferred embodiment of the subject monitoring device 9 is illustrated. The monitoring device shown there is particularly appropriate for applications in which the support components 7 are visible and/or easily accessible. In the embodiment shown, the support component 7 is in the general shape of a U-shaped hoop. An installation plate 31 is firmly connected with the hoop on a backward underside region thereof. As described above, the installation plate 31 is adapted to serve for tilting the support component 7 in a plane of the installation plane from a position of rest into a working position.

Figure 5A:
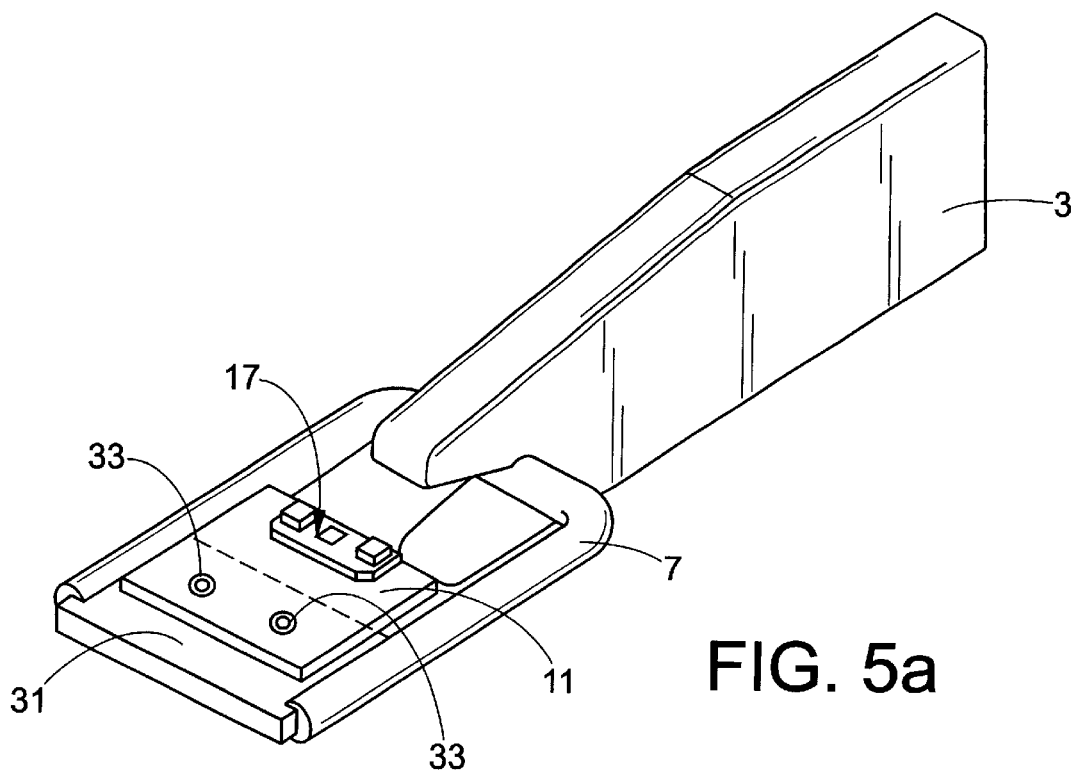
FIG. 5a is a schematic perspective view of a monitoring device in accordance with a second embodiment of the invention; and, FIG. 5b is a schematic perspective view of the monitoring device shown in FIG. 5a with a slider member installed.
Figure 5B:
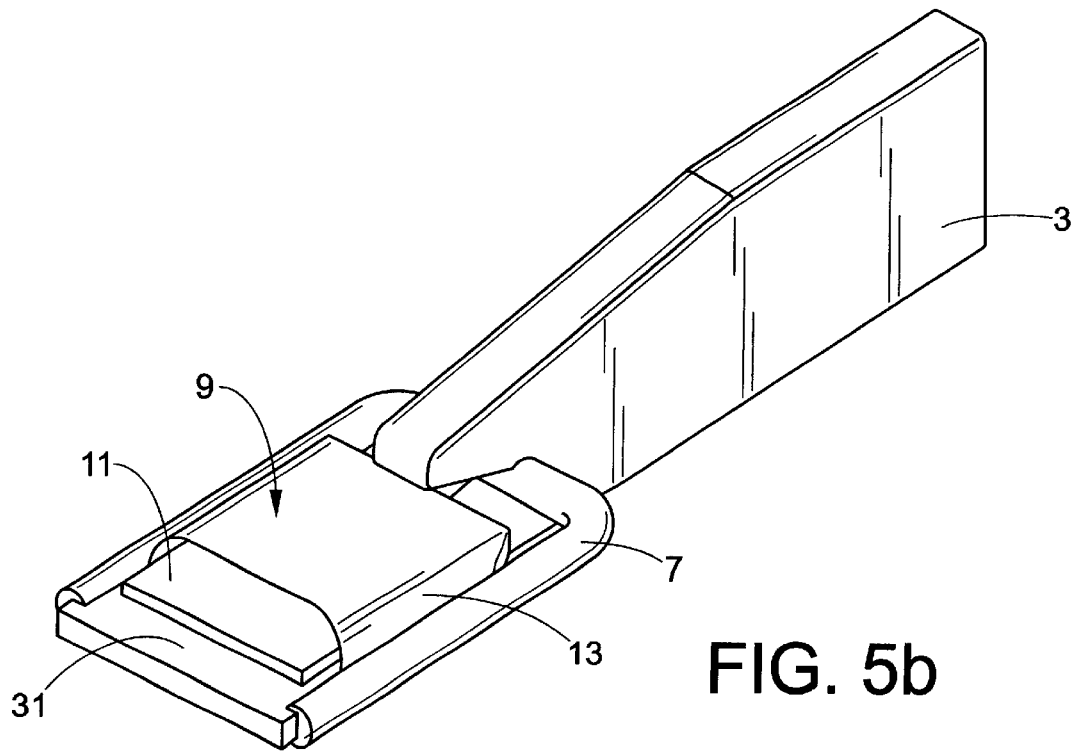

The second preferred embodiment of the monitoring device 9 shown in FIGS. 5a and 5b includes a base body 11 which is suitably attached to the installation plate 31 of the support component 7. The base body is essentially formed in the shape of a plate, whereby the plate is preferably a plastic coated pressed screen on which electronics 17 are placed during construction of the coated pressed screen. The electronics can take any suitable form such as by using the MID technique by application of metallized areas which constitute the conductor paths. As shown in FIG. 5a, the base body 11 includes two locking zones 33 by which the base body is clipped into corresponding recesses in the installation plate 31. Of course, any suitable screw connection or other mechanical connection may also be provided. In the embodiment illustrated in FIGS. 5a and 5b, the slider is movable relative to the plate shaped base body 11. To that end, the base body is formed somewhat narrower than the interior space of the U-shaped support component 7. The slider extends preferably essentially over the full width of the base body 11 and is displaceably guided with its lateral walls by means of the lateral walls of the base body 11. To that end, guide grooves are provided at the interior walls of the side walls of the slider 13. of course, guidance of the slider 13 can also be performed by other methods. According to the figures, the slider 13 thus performs the function of a cover for the electronics 17 and a slider member as described above. Selection of the displacement area and detection of the slider 13 position is accomplished in accordance with the discussion above regarding the specific embodiment illustrated in FIGS. 2–4 and are therefore not repeated here. FIG. 5a shows the final slider position in the "minimal contour" application of the locking component 3. Lastly, it is to be noted that the slider 13 can be moved back into the initial position by means of an electronic element such as, for example, a spring. The spring is used to return the slider in each of the above embodiments (FIGS. 2–4) from its end position to its initial position.

Analytical electronics are described in German Patent Application 198 30 229, the entire contents of which are included herein by reference.

The invention has been described above with reference to the preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. An apparatus for monitoring a locked condition of an associated connecting device adapted for fixing a child seat in a motor vehicle, the associated connecting device including a support component attached to said motor vehicle and a locking component attached to said child seat, the apparatus comprising:

a) a base body selectively connectable with the support component;

b) a slider on the base body, the slider being movable relative to the base body during transfer of the locking component from an unlocked condition to a locking position, the slider being disposed on said base body at a location to contact the locking component and be displaced from an initial slider position corresponding to the unlocked condition of the associated connecting device to an end slider position corresponding to the locking position of the associated connecting device; and, c) a detection device on the base body for detecting said locked condition of the locking component and the support component by detecting the slider in said initial slider position when the associated locking component is in the unlocked condition, and detecting the slider in said end slider position when the associated locking component is in the locking position.

2. The apparatus according to claim 1, wherein the base body is adapted for a one of a locked connection and a screwed connection with the associated support component.

3. The apparatus according to claim 1 wherein the base body includes a guidance region adapted to receive the associated locking component, the guidance region defining an insert channel between the guidance region and the locking component.

4. The apparatus according to claim 3, wherein the insert channel tapers in size in a direction from the associated locking component towards the associated support component.

5. The apparatus according to claim 4, wherein the guidance region is joined with the base body.

6. The apparatus according to claim 5 further including locking recesses formed in side walls of the guidance region, the locking recesses adapting the base body for selective connection 5 with the support component.

7. The apparatus according to claim 6 wherein a portion of the slider adapted to contact the locking component extends in a direction transverse to a direction of relative locking movement between the support 5 component and the locking component, the slider having a width corresponding to a width of the insert channel in an area of the support component.

8. The apparatus according to claim 1 further including a plurality of magnetic elements on said slider, the plurality of magnetic elements being detectable by the detection device.

9. The apparatus according to claim 1 wherein the detection device detects both the initial position and the end position of the slider.

10. The apparatus according to claim 9 wherein the detection device is adapted to generate at least a first and a second electrical signal whereby the first electrical signal corresponds to the 5 initial position of the slider and the second electrical signal the end position of the slider.

11. The apparatus according to claim 10 wherein the detection device is adapted to generate a third electrical signal which corresponds to a position range of the slider between the initial position and the end 5 position.

* * * * *